United States Patent [19]
Kirsgalvis

[11] 3,959,137
[45] May 25, 1976

[54] FILTER HAVING AN INTERIOR LIQUID DISPLACEMENT MEANS, APPARATUS AND METHOD

[75] Inventor: Richard D. Kirsgalvis, Chicago, Ill.

[73] Assignee: Filter Specialists, Inc., Michigan City, Ind.

[22] Filed: Aug. 7, 1975

[21] Appl. No.: 602,590

Related U.S. Application Data

[63] Continuation of Ser. No. 438,280, Jan. 31, 1974, abandoned.

[52] U.S. Cl. ................................. 210/84; 210/232; 210/438; 210/474
[51] Int. Cl.² ................... B01D 23/04; B01D 29/10
[58] Field of Search ............... 210/65, 84, 109, 110, 210/114, 115, 121, 232, 331, 304, 308, 418–420, 438, 443–445, 473, 474, 478, 512, 541; 55/333, 368

[56] References Cited
UNITED STATES PATENTS

| | | |
|---|---|---|
| 360,441 | 4/1887 | Howes ............................. 210/121 |
| 1,062,236 | 5/1913 | Hitchcock ..................... 210/420 X |
| 2,170,247 | 8/1939 | Lambert ........................... 210/114 |
| 2,259,633 | 10/1941 | Guillaume ........................ 210/114 |
| 3,295,689 | 1/1967 | Arranitakis ................... 210/391 X |
| 3,526,323 | 9/1970 | Smith ................................ 210/460 |
| 3,547,267 | 12/1970 | Sutherland ...................... 210/456 |

*Primary Examiner*—Theodore A. Granger
*Attorney, Agent, or Firm*—Oltsch & Knoblock

[57] ABSTRACT

A method of filtering and a filter having a housing in which a filtering screen having a bag-shaped configuration is located. A removable floatable container is located within the filter housing, inside the filter screen. The container includes parts which are spacedly positioned from the screen so as to enable liquid flow through the filter to pass around the container and through portions of the screen.

6 Claims, 3 Drawing Figures

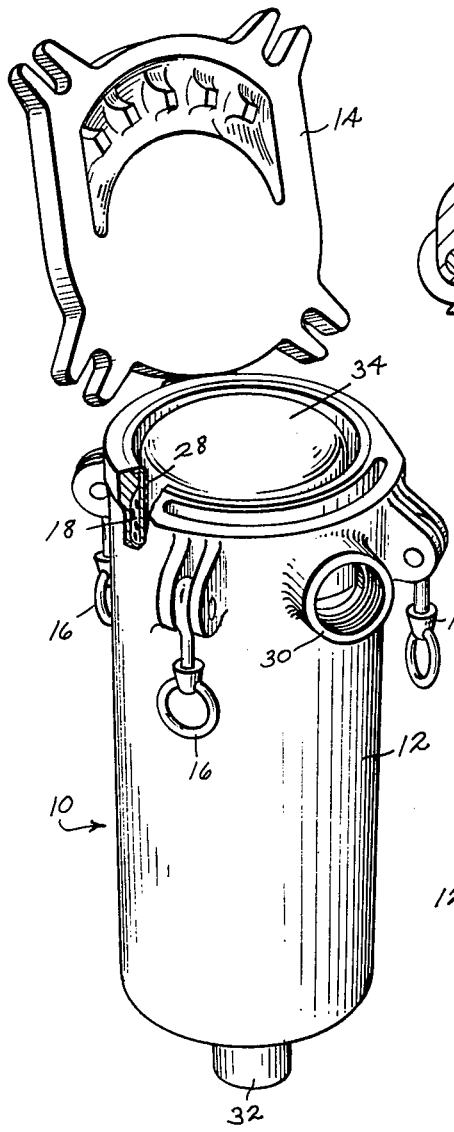
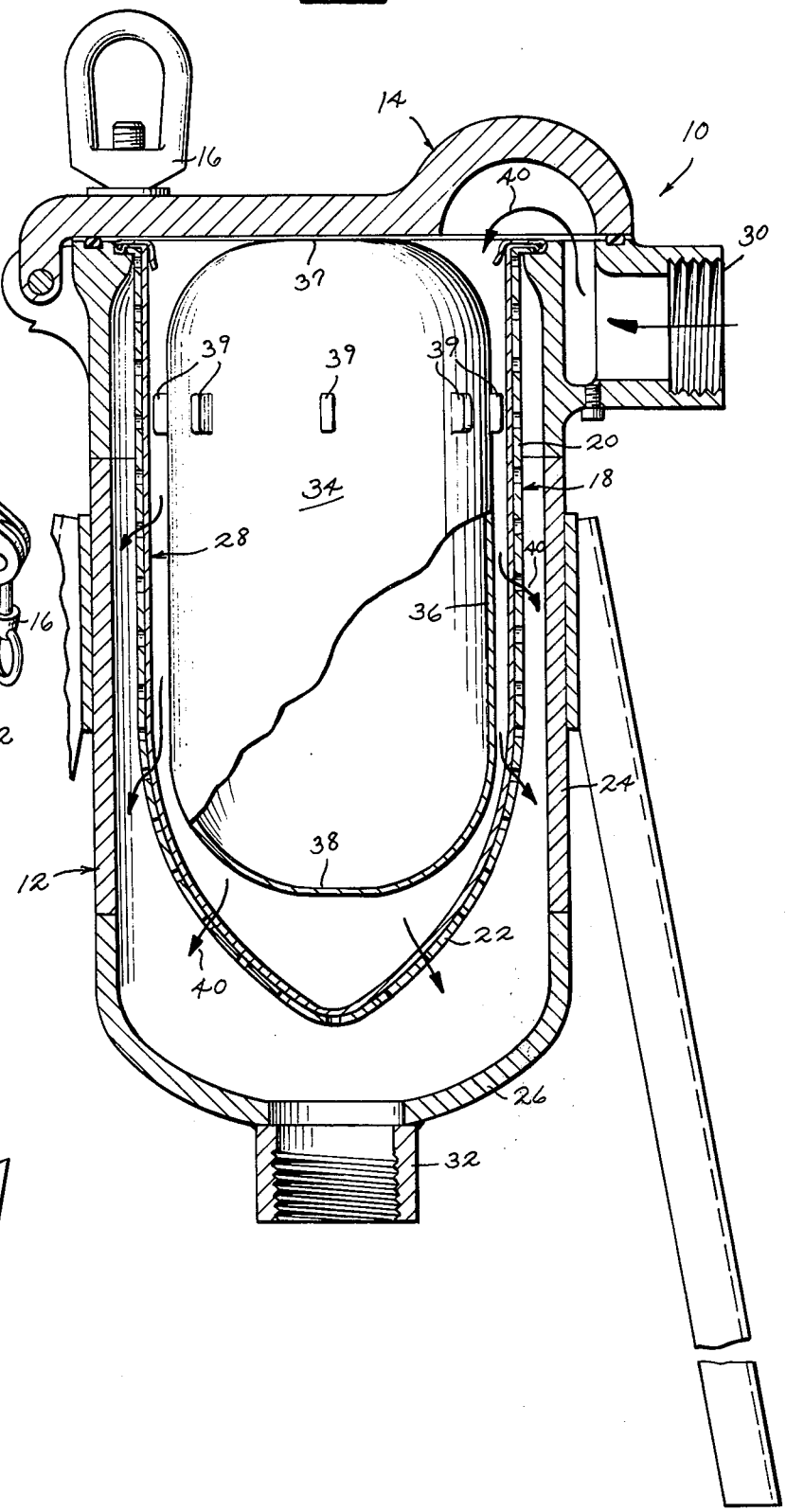

FILTER HAVING AN INTERIOR LIQUID DISPLACEMENT MEANS, APPARATUS AND METHOD

CROSS REFERENCE TO RELATED APPLICATION

This is a continuation of application Ser. No. 438,280, filed Jan. 31, 1974, now abandoned.

SUMMARY OF THE INVENTION

This invention relates to a liquid filter and has specific application to filter apparatus and a method for displacing liquid within the filter to substantially reduce the liquid volume in the filter without affecting the filter flow rate or capacity and for sealing a portion of the filter screen or bag to facilitate draining of the filter for cleaning or repair.

In this invention a floatable container is positioned within the filtering means of the filter. The container includes parts spaced from portions of the filtering means so as to allow liquid flow through the filtering means during the filter operation. When it becomes necessary to replace or clean the filtering means, the cap of the filter housing can be removed and the container removed. The container when positioned within the filter displaces a high percentage of the volumetric space within the filtering means. Thus, only a small amount of liquid will remain within the filter after the filter cap has been opened and the container removed, thereby making cleaning or replacement of the filtering means easier as well as reducing to a minimum the amount of liquid within the filter which must be disposed of during the cleaning or replacement operation. Additionally, the container can be utilized to seal a portion of the filtering means during normal filter use to facilitate draining of the filter when the container is removed.

Accordingly, it is an object of this invention to provide a means of reducing the amount of waste liquid remaining in a filter at the time of cleaning or replacement of its filtering means.

It is another object of this invention to provide a method of displacing liquid within the screen of a filter for the purpose of facilitating cleaning of the filter.

Still another object of this invention is to provide a means of facilitating the draining of liquid from within a filter at the time of cleaning or replacement of its filtering means.

Other objects of this invention will become apparent upon a reading of the invention's description.

BRIEF DESCRIPTION OF THE DRAWINGS

FIG. 1 is a perspective view of one embodiment of the filter of this invention shown with its cap in an open position.

FIG. 2 is a longitudinal sectional view of the filter of FIG. 1 shown with its cap closed and with liquid flow passing through the filter.

DESCRIPTION OF THE PREFERRED EMBODIMENTS

Figure 3:
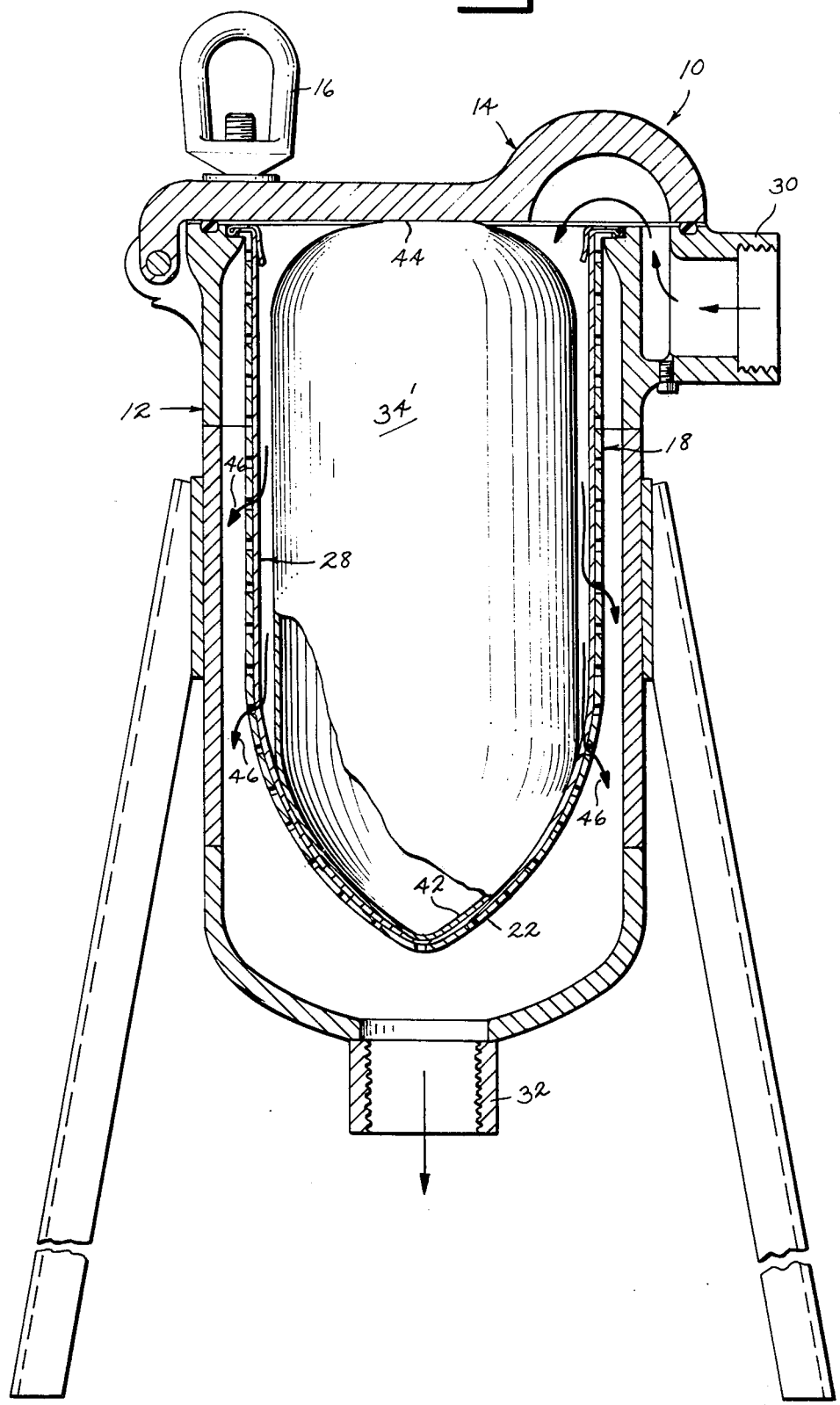
FIG. 3 is a longitudinal sectional view of another embodiment of the filter of this invention shown with its cover closed and with liquid passing through the filter.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Referring first to the embodiment of the filter shown in FIGS. 1 and 2, reference numeral 10 refers to the filter housing which includes a base member 12 and a cap 14. Cap 14 is hinged at the upper end portion of base member 12 so as to be shiftable between an open position as shown in FIG. 1 and the closed position shown in FIG. 2. Suitable hold-down clamps 16 are provided to secure the cap in its closed position over the open end of base member 12. A bag-shaped filtering screen 18 is supported by base member 12 within housing 10. Screen 18 includes a cylindrical side wall 20 and a convex bottom wall 22, all spacedly positioned from side wall 24 and bottom wall 26 of the base member. A porous filter bag 28 which is open at its top fits within screen 18. Housing 10 includes a liquid inlet 30 which is located at the upper end portion of the housing and which is in flow communication with the interior of filter bag 28 and a liquid outlet 32 which is located in the lower end portion of housing 10. Liquid will enter housing 10 through inlet 30 and pass downwardly into the interior of filter bag 28, then outwardly through the filter bag and screen 18, there passing between the screen and side wall 24 and bottom wall 26 of housing base member 12 and finally exiting from the filter through outlet 32 thereof.

A closed hollow container tank 34 is positioned within filter bag 28. Container 34 is formed with a cylindrical side wall 36 and generally rounded end walls 37 and 38. The outer diameter of container side wall 36 is less than the inner diameters of filter bag 28 and screen 18 so that there is spacing for liquid flow between the container and filter bag. Located circumferentially about container side wall 36 is a plurality of annularly spaced projections 39 which serve to position the container near the longitudinal axes of filter bag 28 and screen 18 with the side wall 36 of the container being spaced circumferentially from the filter bag. Liquid flow, as indicated by arrows 40, upon entering housing 10 flows around container 34 within the interior of filter bag 28 and outwardly through the filter bag and screen 18 at a substantially unrestricted flow rate. The volume between the container side wall 36 and filter bag 28 and screen 18 is appropriately correlated to the areas of inlet 30 and outlet 32 so that the flow rate capacity remains substantially unchanged.

During liquid flow through housing 10 of the filter, the interior of filter bag 28 will be filled with liquid with the exception of that volumetric part of the bag taken by container 34. Container 34 is designed to float within the interior of filter housing 10 in the manner illustrated in FIG. 2. You will note that the length of container 34 and the curvature of the lower end wall 38 thereof are such that liquid flow may pass along the entire length of the container with a portion of the liquid passing outwardly through bottom wall 22 of screen 18.

When filter bag 28 becomes clogged during use, thereby necessitating its removal and cleaning or replacement, liquid flow through the filter is terminated and cap 14 opened. Container 34 is then pulled upwardly out of housing 10 with only a minimal amount of liquid remaining within the bag and remainder of the housing. By having very little liquid remaining within the filter bag, its removal and cleaning or replacement are made easier and the amount of liquid which remains within the filter bag and which is generally disposed of is substantially reduced. It is to be understood that in some embodiments of the filter shown in FIGS. 1 and 2 it would not be necessary to construct container 34 with projections 39. Without projections 39, container 34 would seek its own position within filter bag 28 during liquid flow through the filter.

In FIG. 3, container 34' positioned within filter bag 28 is of a modified form. In this construction of the filter, housing 10, screen 18 and filter bag 28 is of a similar construction as that described in FIGS. 1 and 2. Lower end wall 42 of container 34' is designed with a convex configuration and is shaped to complementally conform with bottom wall 22 of screen 18. Container 34' is designed so that its upper end wall 44 abuts cap 14 when the cap is in its closed position over the open end of base member 12 of the filter housing with the cap urging lower end wall 42 of the container into contact with filter bag 28 which in turn is urged against bottom wall 22 of the screen. Due to the complemental shape between lower end wall 42 of container 34' and bottom wall 22 of screen 18, container 34' will substantially seal the lower end portion of filter bag 28 and thereby cause substantially all of the liquid passing into the filter bag from inlet 30 to pass outwardly along the sides of the bag and through screen 18 as illustrated by arrows 46.

When it is desired to change or remove filter bag 28 from the housing 10, thus exposing the lower end of the filter bag which had been substantially sealed from the liquid by end wall 42 of the container. With the clean lower end portion of filter bag 28 now exposed, the remaining small amount of liquid within the bag will drain from the filter. Once the liquid within the filter bag has drained, the bag can be removed and cleaned or replaced. Thus, container 34' serves not only to reduce the volume of filter bag 28, thereby minimizing the amount of liquid left remaining in the bag upon removal of the container, but container 34' also serves to seal the lower end portion of the bag during the filtering operation to permit rapid draining of the remaining liquid from the filter upon removal of the container.

It is to be understood that the invention is not to be limited to the details above given, but may be modified within the scope of the appended claims.

What I claim is:

1. A method for displacing liquid within a filter, said filter including a housing having a base member and a removable cap, said base member having an open top and being defined by side and bottom walls, said cap spanning the base member top, a reticulated filtering means carried within said housing and having portions spaced from said base member, said housing having a liquid inlet means in flow communication with the interior of said filtering means and a liquid outlet means in flow communication with said base member at said spaced filtering means portions, liquid within said base member, said method comprising the steps:
    a. providing a floatable container having an external transverse dimension which is less than the internal transverse dimension of said filtering means,
    b. removing the cap of said housing and inserting said container into said filtering means to displace a substantial portion of said liquid within said base member with said container being spaced from said filtering means at said base member bottom wall and at sections of said base member side wall, and
    c. replacing said cap over said base member top to enclose said container within said filtering means to accommodate liquid flow through said filter between said inlet and outlets and around said container with said container being buoyed by said liquid.

2. A filter for a liquid, said filter comprising a housing having a base member and a removable cap, said base member having an open top and being defined by side and bottom walls, said cap spanning said base member top, a bag-shaped reticulated filtering means carried within said housing and having portions spaced from said base member, said filtering means having a shape-retaining frame and including a side wall, said housing having a liquid inlet means in flow communication with the interior of said filtering means and a liquid outlet means in flow communication with said base member at said spaced filtering means portions, a removable floatable container means for decreasing the volumetric interior size of said filtering means, said container means fitting within said filtering means and having spaced projecting side wall means for contacting said filtering means side wall to space that portion of said container means extending between said projecting side wall means from said filtering means to define liquid flow passage means from said inlet means to said spaced filtering means portions wherein liquid in passing through said filter from said inlet to said outlet will flow around said container.

3. The filter of claim 2 wherein said container means is hollow.

4. The filter of claim 3 wherein said container is enclosed.

5. The filter of claim 2 wherein said projecting side wall means are fin shaped projections.

6. A filter for a liquid, said filter comprising a housing having a base member and a removable cap, said base member having an open top and being defined by side and bottom walls, said cap spanning said base member top, a bag-shaped reticulated filtering means carried within said housing and having portions spaced from said base member, said housing having a liquid inlet means in flow communication with the interior of said filtering means and a liquid outlet means in flow communication with said base member at said spaced filtering means portions, a removable closed container means for decreasing the volumetric interior size of said filtering means, said container means fitting within said filtering means and having side wall parts spaced from said filtering means defining liquid flow passage means from said inlet means to said spaced filtering means portions wherein liquid in passing through said filter from said inlet to said outlet will flow around said container, said filtering means including an end wall, said container means having an end wall fitting against and substantially sealing said filter means end wall from said liquid, said container means abutting said cap when said cap spans said housing base member.

* * * * *